(12) United States Patent
Maffeis (10) Patent No.: US 8,585,113 B2
(45) Date of Patent: Nov. 19, 2013

(54) PARALLEL PNEUMATIC GRIPPER

(75) Inventor: Giuseppe Maffeis, Roncadelle (IT)

(73) Assignee: GIMATIC S.p.A., Roncadelle, Brescia (IT)

( * ) Notice: Subject to any disclaimer, the term of this patent is extended or adjusted under 35 U.S.C. 154(b) by 26 days.

(21) Appl. No.: 13/289,351

(22) Filed: Nov. 4, 2011

(65) Prior Publication Data

US 2012/0043777 A1 Feb. 23, 2012

(30) Foreign Application Priority Data

May 11, 2010 (IT) .................................. BS10A0177

(51) Int. Cl.
*B25J 15/08* (2006.01)

(52) U.S. Cl.
USPC ............................ 294/192; 294/195; 294/207

(58) Field of Classification Search
USPC .......... 294/192, 195, 207; 901/37; 269/25, 33
See application file for complete search history.

(56) References Cited

U.S. PATENT DOCUMENTS

| | | | |
|---|---|---|---|
| 5,163,729 A * | 11/1992 | Borcea et al. ............... | 294/119.1 |
| 5,529,359 A * | 6/1996 | Borcea et al. ................ | 294/207 |
| 5,620,223 A | 4/1997 | Mills | |
| 5,762,391 A * | 6/1998 | Sumnitsch ................ | 294/119.1 |
| 6,309,003 B1 | 10/2001 | Bertini | |
| 6,598,918 B1 * | 7/2003 | Null et al. ...................... | 294/207 |
| 7,748,761 B2 * | 7/2010 | Simons ......................... | 294/207 |

FOREIGN PATENT DOCUMENTS

| | | |
|---|---|---|
| JP | 61 230894 A | 10/1986 |
| JP | 62-132005 A | 6/1987 |
| JP | 2005 034927 A | 2/2005 |

* cited by examiner

*Primary Examiner* — Dean Kramer
(74) *Attorney, Agent, or Firm* — McGlew and Tuttle, P.C.

(57) ABSTRACT

The invention relates to a pneumatic gripper which comprises a gripper body (21,121), at least two pneumatic control pistons (23) operating within at least one chamber (22,122) defined by the gripper body and movable in opposite directions with respect to each other by a driving fluid supplied to the chamber, at least two guide columns (34) associated with each piston and emerging from the ends of at least the chamber, and at least two jaws (37) movable with the pistons between an active position for gripping a work-piece and an inactive position for releasing the work-piece. The guide columns (34) are attached directly in front of and inside the profile of a respective piston (23), and each gripping jaw (37) may be attached directly to the ends of the columns of a relevant control piston.

17 Claims, 7 Drawing Sheets

PARALLEL PNEUMATIC GRIPPER

FIELD OF THE INVENTION

The present invention relates generally to the field of pneumatic grippers for gripping various parts, objects or bodies during the stages of production and/or handling and/or assembly thereof by means of robot systems, and it relates particularly to a parallel pneumatic gripper having at least one pair of gripping jaws linearly movable in opposite directions for opening and closing the jaws by means of a single-acting or double-acting pneumatic control system.

BACKGROUND ART

In the field considered here, pneumatic grippers of varying configuration, size and gripping or clamping power are already known and available. Also known among these various types of pneumatic grippers are parallel grippers of the so-called long-stroke or wide-opening type, which essentially comprise a gripper body, two pneumatic control pistons operating within said body, movable in opposite directions with respect to each other and each having a coaxial pushing/pulling stem, two guide columns sliding within the gripper body in parallel to the control pistons and dragged by the same control pistons, and at least two jaws, or fingers, movable by the pistons between an active position for gripping a work-piece and an inactive position for releasing the work-piece.

In one embodiment, the pneumatic control pistons are arranged and operate inside parallel chambers formed in the gripper body, while the guide columns are two in number and are driven within longitudinal seats also formed in the gripper body, along the sides the chambers for the pistons. In another embodiment, the pneumatic pistons are aligned and operate inside the same chamber, with respective stems directed in opposite directions and parallel to guide columns which are also driven longitudinally within the gripper body along the sides of said chamber, as disclosed, for example, by documents JP 62-132005 and U.S. Pat. No. 6,309,003.

In any case, the stem of a first piston and a guide column are directed and extend towards the outside of the gripper body through one of its ends, while the stem of the second piston and the other guide column are directed and extend towards the outside of the opposite end of the gripper body.

One of the gripping jaws or fingers of the gripper is attached both to the stem of a piston and to a column directed in the same direction, and the other jaw is attached both to the stem of the other piston and to the column which are directed in the opposite direction. Usually, each jaw is attached to the associated stem and column not directly, but through a support base.

The jaws are displaced into either an active position or a passive position, depending on the displacement of the pistons in opposite directions.

These parallel grippers can be used to grip a work-piece from the outside or inside thereof, if the work-piece has a cavity. In order to grip a work-piece from the outside, the jaws are brought into the active position when the pistons are displaced so to move the jaws from a position where they are far from each other to a position where they are close to each other. On the other hand, in order to grip a work-piece on the inside, the jaws are brought into the active position when the pistons are displaced so as to move the jaws from a position where they are close to each other to a position where they are far from each other.

The movements of the jaws from a position to the other can be synchronized by a rack and pinion mechanism associated with the control pistons.

However, such pneumatic grippers are not without drawbacks and disadvantages.

Clearly, the presence of the longitudinal seats for the guide columns, situated parallel with to the sides of the control pistons within the same gripper body, limits the space available for forming the piston chamber(s). Consequently, the chamber or each chamber has a bore which is limited in size or, in any case, relatively small compared to the transverse dimensions of the gripper body, so that each piston will have a diameter which is equally small, resulting in a limited clamping power.

Therefore, under these conditions, in order to achieve a higher clamping power, it is necessary to employ grippers larger in size which disadvantageously occupy a larger volume and are also heavier as well as difficult to be manufactured.

Moreover, each variation in length of the closing and opening strokes of the gripper in relation to the work-pieces to be gripped, as required, may be performed either by replacing the jaws with other jaws having thicknesses which are different in each case, or by providing them with spacers.

The stems of the pistons and the guide columns may be provided with seals, but according to the solutions provided hitherto by the prior art, the wear of these seals results in the penetration of dirt and/or fluids into the gripper body, in which case the gripper has to operate in wet environments which can reduce the efficiency and working life of the tool.

AIM AND ADVANTAGE OF THE INVENTION

The aim of the present invention is to provide an effective solution to the aforementioned drawbacks and disadvantages of the prior art with regard to parallel pneumatic grippers of the long-stroke or wide-opening type, so as to improve their performance in terms of clamping power while ensuring that the jaws are centered and guided, and in order to ensure a sealing action against external agents and a reliable operation of the gripper in any conditions of use.

The present invention has been conceived on the basis of the consideration that, for the same shape and transverse dimensions of a pneumatic gripper body, the control pistons could have a larger diameter and the gripper a higher clamping power if the guide columns are suppressed along the sides of the piston chambers and if an improved sealing action is provided on the guiding means and pushing/pulling means.

Accordingly, the aim of the invention has been achieved by a parallel pneumatic gripper according to the preamble of claim 1, wherein the guiding and pushing/pulling columns are all attached directly in front of a respective piston, and each gripping jaw may be attached directly to the ends of the columns of a relevant control piston.

The in-line arrangement of the control pistons and the direct attachment of the guide columns in front of, and therefore inside the profile of the pistons, without occupying space along the sides thereof, is such that the chamber defined by the gripper body, and similarly each control piston, may have cross-sectional dimensions which are similar to those of said body less, obviously, the thickness of the wall which define it externally. Therefore, the chamber and each piston have a cross-section which is much greater than that of conventional pneumatic grippers, with a gripper body of the same size.

In other words, compared to similar conventional pneumatic grippers, since the parallel pneumatic gripper according to the invention can have pistons larger in diameter, it will provide a higher clamping power or, for the same power, it can be smaller in volume and weight. Moreover, each piston operates directly on all the guide columns which are connected thereto in a coaxial manner, so as to exploit fully the existing thrust forces.

The guide columns attached to each control piston may be two, three or more in number and ensure that the pistons are supported, centered and non-rotatable if they are cylindrical, and that the jaws are stiff during use.

In particular, moreover, a movable intermediate connector arranged between the pistons ensures synchronized movements thereof in opposite directions for the correct displacement of the jaws between the closed and open positions.

Therefore, advantageously, the intermediate connector is formed simply by a member swinging about an associated central pin and slidably connected to the facing parts of the control pistons.

Seals are also provided between the gripper body, its heads and the guide columns, said seals acting to form both a static and a dynamic sealing system preventing the penetration of both dirt and fluids into the gripper body from the outside, with a degree of protection equivalent to at least Class IP67.

BRIEF DESCRIPTION OF THE DRAWINGS

Further details of the invention will become clear from the description provided below with reference to the accompanying drawings which are only illustrative and not limitative, in which.

DETAILED DESCRIPTION OF THE INVENTION

In the embodiment shown in FIGS. 1-7, the gripper according to the invention comprises a gripper body 21 which defines internally a longitudinal chamber 22 accommodating two pneumatic control pistons 23 which are aligned.

Figure 1:
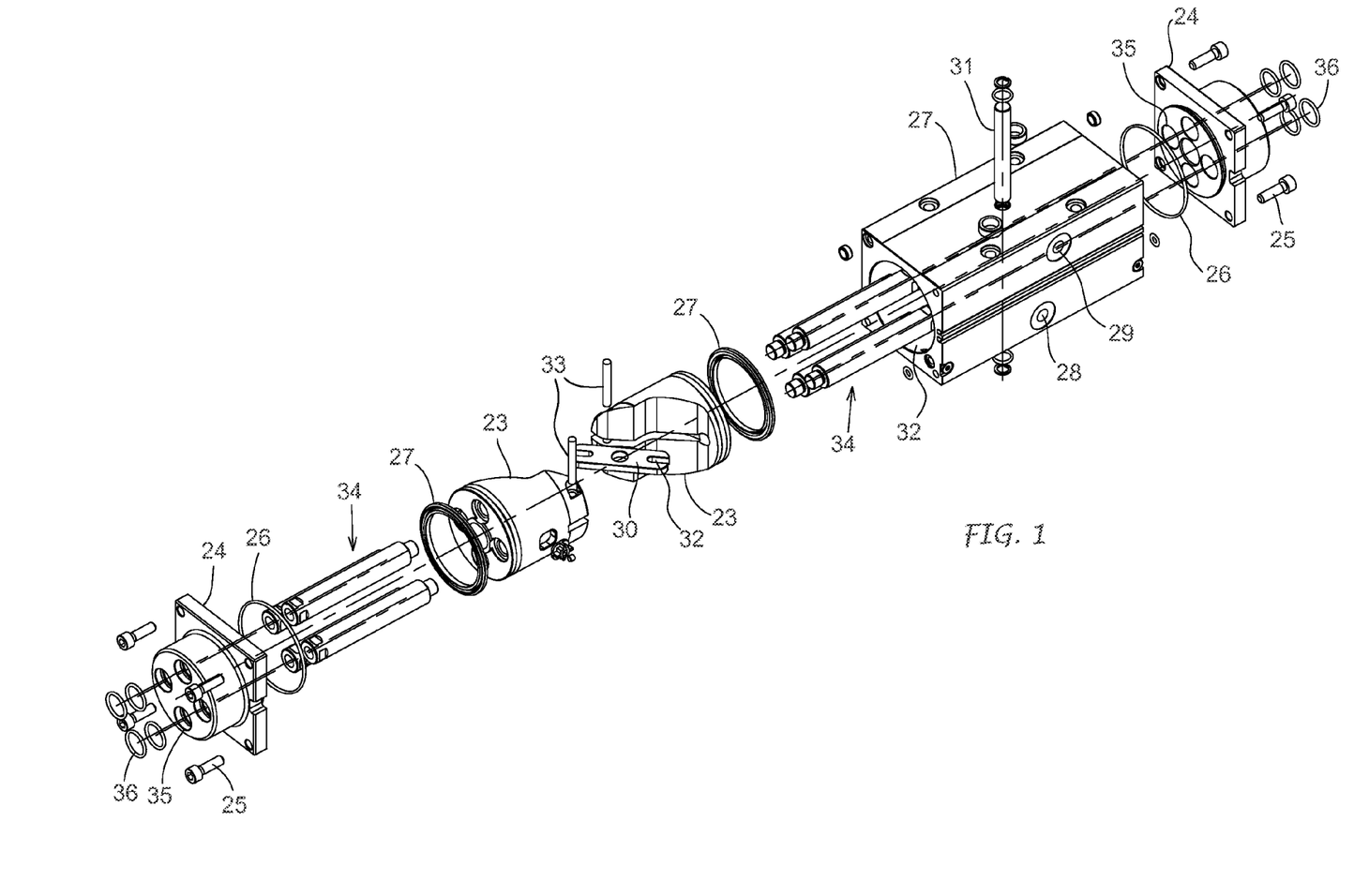
FIG. 1 shows an exploded view of the components of a parallel pneumatic gripper with two jaws.
Figure 5:
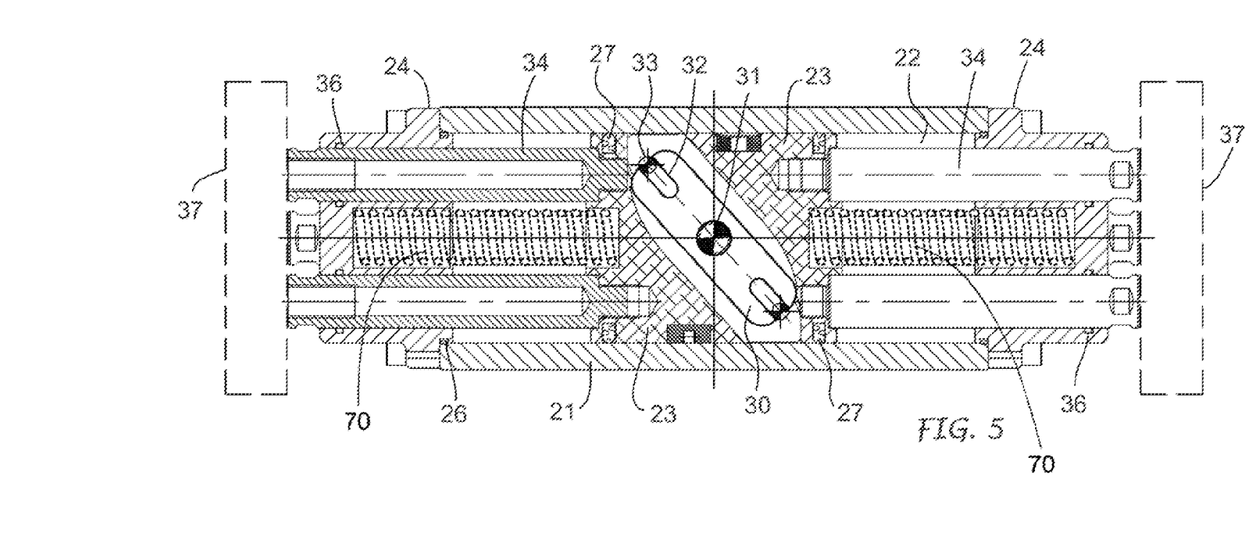

Preferably, the gripper body 21 is formed from an extruded shape with a square cross-section and an axial cavity. The longitudinal chamber 22 is closed at its opposite ends by two heads 24 which are each attached to the gripper body by means of screws 25 and at least one intervening seal 26. The longitudinal chamber 22 may be cylindrical and, therefore, the pneumatic control pistons 23 will have a cross-section and a diameter corresponding to those of said chamber.

In particular, the control pistons 23 are arranged in-line and are movable within the chamber 22 in opposite directions, so as to be alternately moved towards and away from each other.

In order to allow the pistons to be moved close to each other while limiting their overall length, the facing parts of the two control pistons 23 are cut obliquely or chamfered so that they can overlap each other—see FIG. 5.

These control pistons 23 are each provided with at least one peripheral seal 27 on the inner surface of the chamber 22. The reciprocating movements in opposite directions of said pistons are caused by a driving fluid, typically air, which is supplied into and discharged from the chamber 22 alternately through fluid-inlet and fluid-outlet holes 28, 29 obtained in the body on opposite sides of each control piston.

In order to ensure synchronized movements of the control pistons 23, they are connected together by a connector 30 which is swingingly mounted about a central pin 31 fitted in the gripper body and provided, at its opposite ends, with slots 32 engaging and interacting with pins 33 attached to the pistons.

Both the control pistons 23 are provided with guide columns 34, the columns of one piston being directed in the opposite direction to the columns of the other piston. In particular, each control piston has attached thereto, for example by means of screw connections, two or more parallel guide columns 34 (four in the example shown) which extend from the piston itself towards the outside of the chamber 22 through corresponding guide holes 35 formed in each head 24. At least one radial seal 36 is arranged between each column 34 and the relevant guide hole 35. Preferably, these guide columns 34 are all identical and may have a cross-section which is solid or at least partly hollow for lightening thereof.

A gripping jaw 37—shown in broken lines in FIGS. 4-7—which may be configured in each case depending on the shape of the work-piece to be gripped, is removably attached to the ends of the guide columns 34 of each piston 23.

Advantageously, each jaw 37 may be attached directly to the respective guide column 34 without the need for intermediate means although it is not excluded, however, that a support base may be used between each jaw and the guide columns to which it has to be attached.

In any case, the gripper has two gripping jaws 37 movable in parallel in opposite directions between a first position and a second position, depending on the direction of movement of the pistons.

Figure 2:
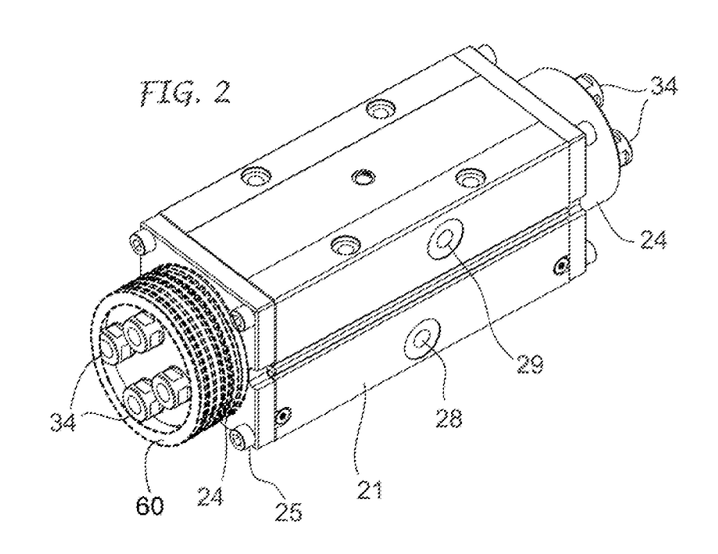
FIGS. 2 and 3 show an axonometric view of the parallel pneumatic gripper of FIG. 1 when assembled, in the closed and open positions respectively.
Figure 4:
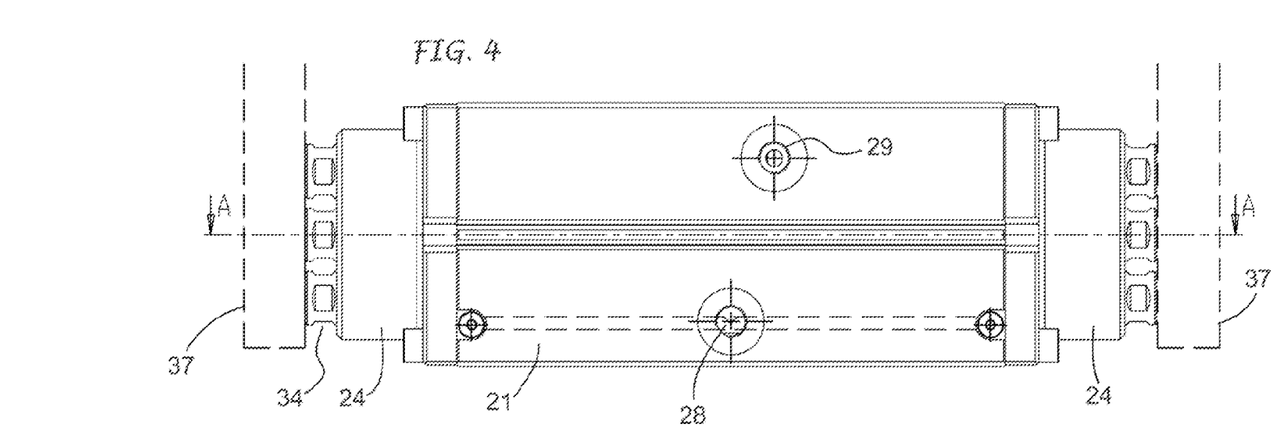
FIGS. 4 and 5 show respectively a side view and a longitudinally sectioned view, taken along the arrows A-A, of the parallel pneumatic gripper in the closed position.

In the first position, the guide columns 34 are retracted within the gripper body 21 and the jaws 37 are close to each other—see FIGS. 2, 4 and 5.

Figure 3:
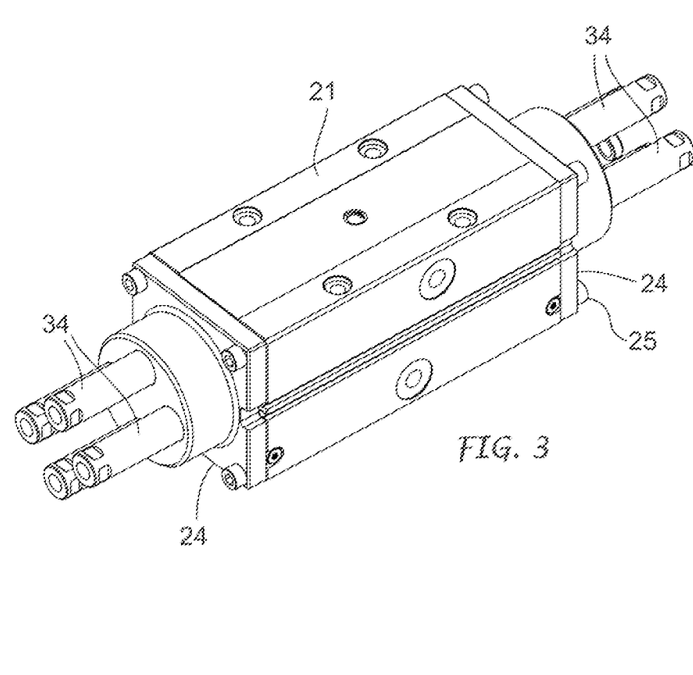
Figure 6:
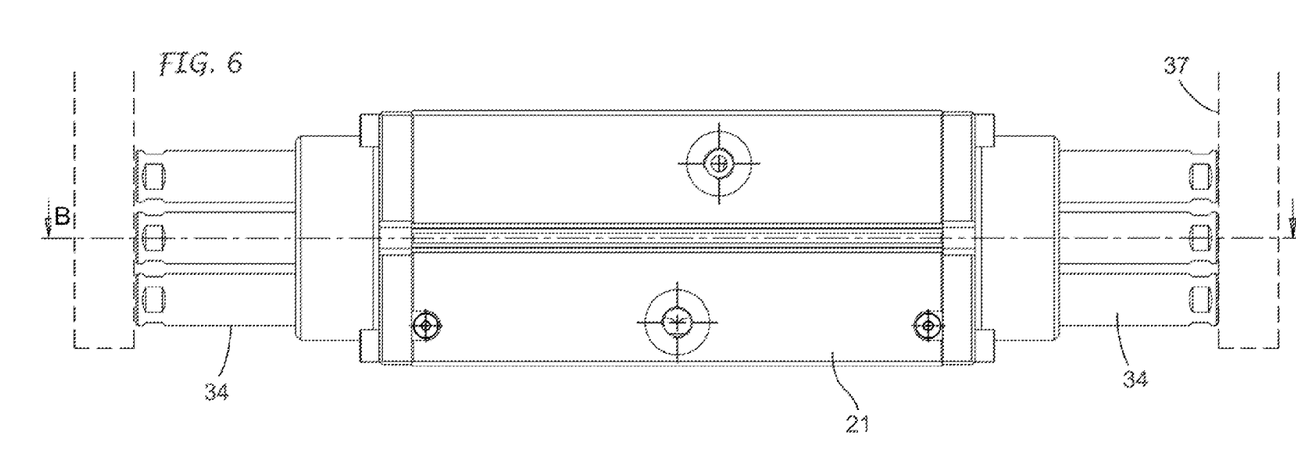
FIGS. 6 and 7 show respectively a side view and a longitudinally sectioned view, taken along the arrows B-B, of the parallel pneumatic linear gripper in the open position.
Figure 7:
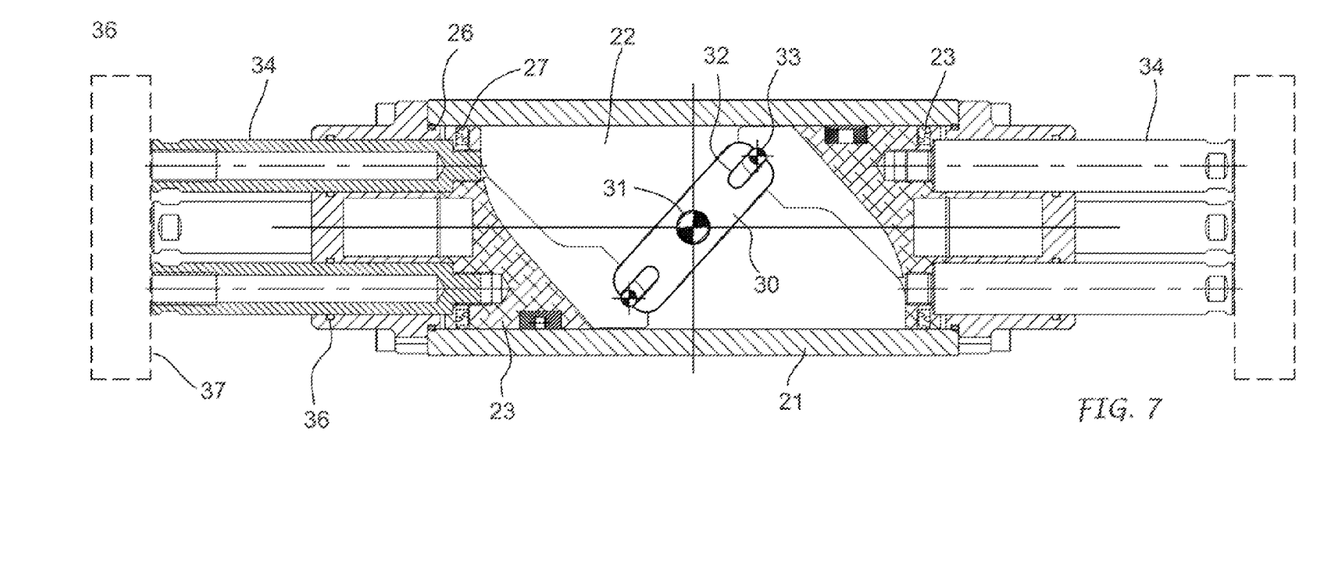
Figure 8:
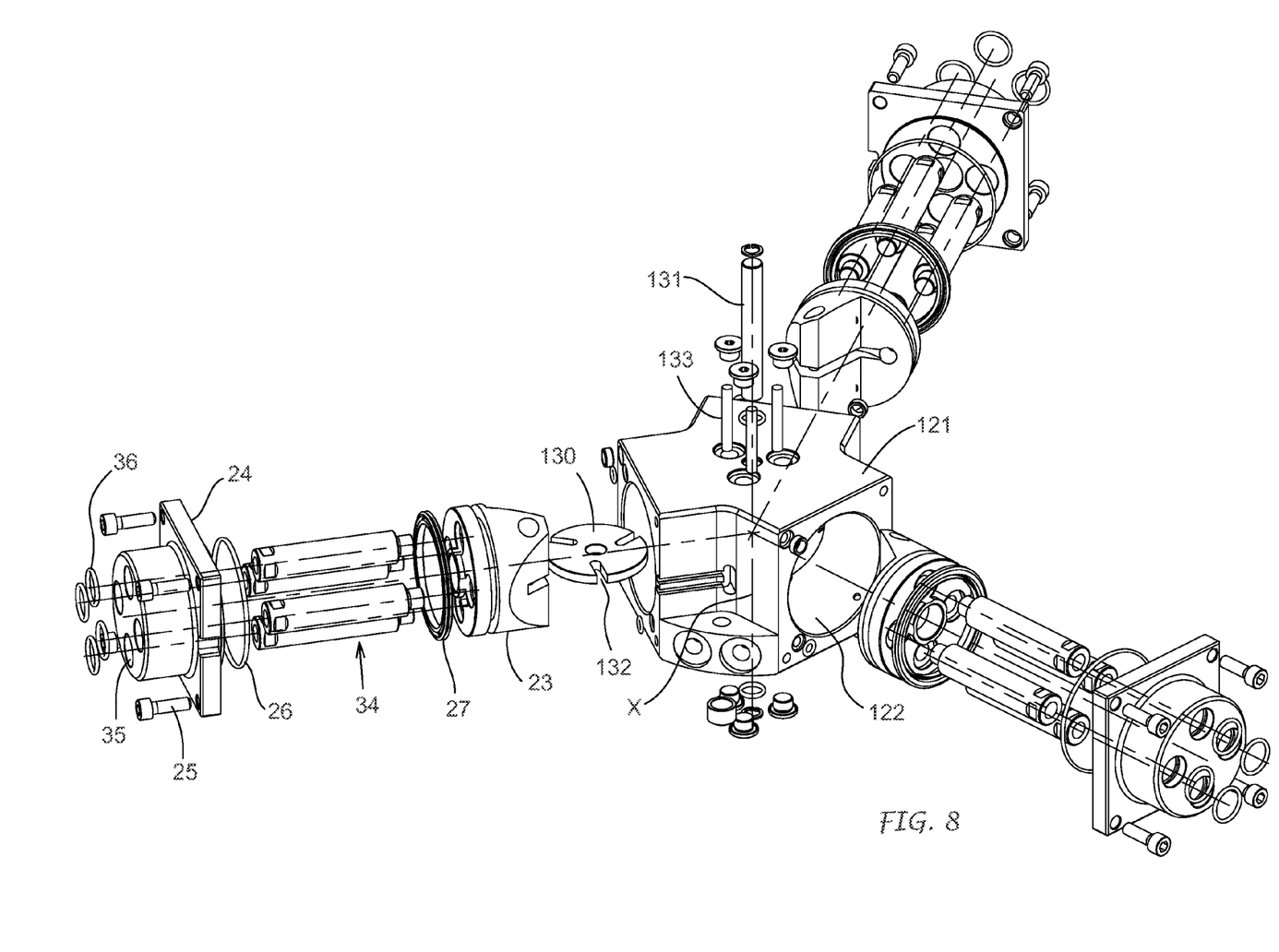
FIG. 8 shows an exploded view of the components of a pneumatic gripper with three angularly spaced jaws.
Figure 9:
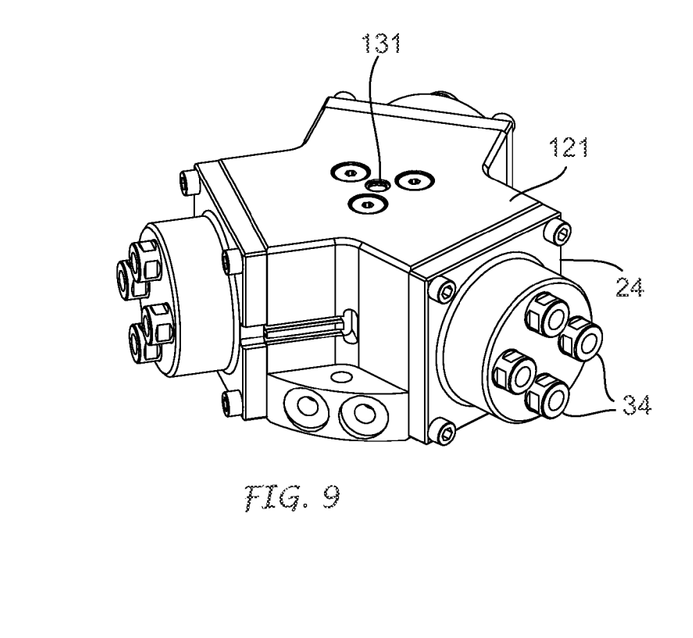
FIGS. 9 and 10 show an axonometric view of the gripper with three jaws of FIG. 8 when assembled, in the closed and open positions respectively.
Figure 10:
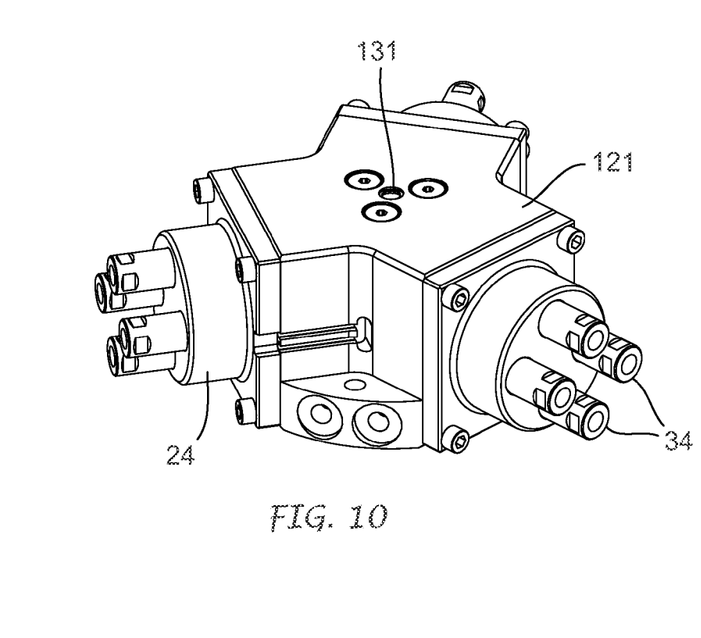
Figure 11:
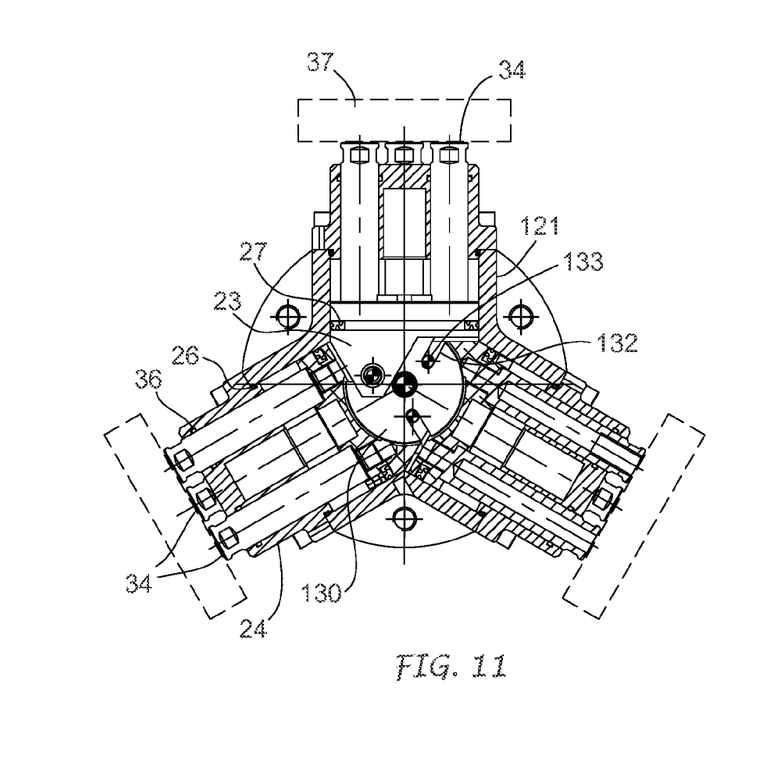
FIG. 11 shows a cross-section through the closed gripper of FIG. 9.
Figure 12:
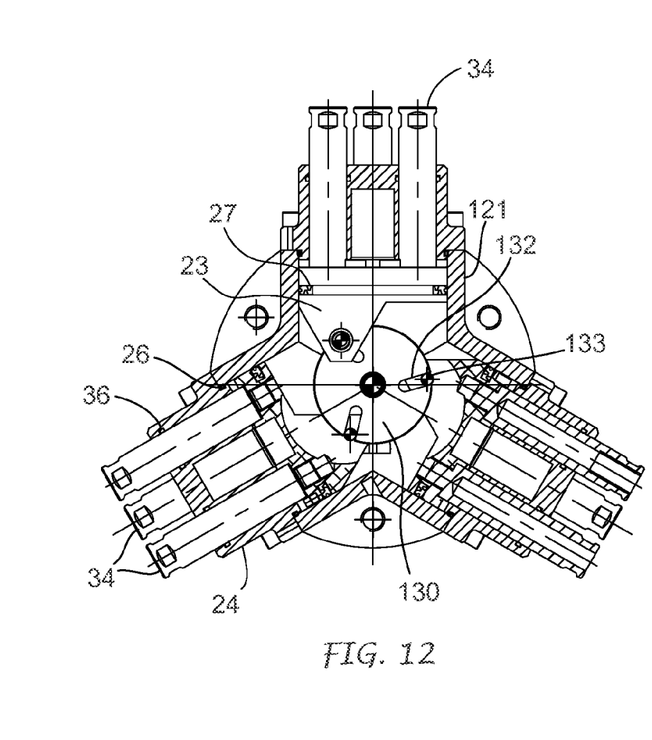
FIG. 12 shows a cross-section through the open gripper of FIG. 10.

In the second position, the guide columns protrude longitudinally from the gripper body 21 and the jaws 37 are spaced apart from each other—see FIGS. 3, 6 and 7. In particular, in the example shown, the first position corresponds to a closed condition of the jaws 37, namely an active position of the gripper for gripping a work-piece or object; the second position corresponds to an open condition of the jaws, namely the inactive position of the gripper. However, with jaws properly adapted and oriented, the gripper could be active when the jaws are spaced apart from each other and inactive when they are close to each other.

The seal 27 on each piston 23, together with the seals around the guide columns 34 and between each head 24 and the gripper body, ensure effective protection of the tool against penetration of dirt or fluids from the outside. This protection is further increased in that, around each of the guide columns, a pressurized-air cavity is created between the piston to which they are connected and the respective seals 36 in order to create barriers which prevent the entry of any substances from the outside.

In the assembly described above, the gripper is provided with two opposite gripping jaws but advantageously, it is also possible to use its same components, except for the gripper body and the connector, for the embodiment of pneumatic grippers with three or more jaws.

By way of example, FIGS. 8 to 12 show a pneumatic gripper which comprises three gripping jaws 37 angularly spaced about a central axis X. In these figures, the same reference numbers are used to indicate components which are identical or equivalent to those of the linear gripper as shown in FIGS. 1-7.

In this other embodiment, the gripper body 121 defines three chambers 122 which are equally spaced around the central axis X and are each closed by an end head 24. Said chambers 122 communicate at their ends directed towards the central axis X, and each of them accommodates a pneumatic piston 23. Two or more guide columns 34 are connected to each piston 23 and extend outwards through guide holes 35 formed in the relevant head. A connector 130 is provided between the closed and open positions of the jaws 37 for synchronizing the movement of the control pistons 23, said connector being circular or having three radial arms and being rotatable about a central pin 131 and connected to the three control pistons by means of pins 133 interacting with slots 132.

Also in this case, a seal 27 is provided on each piston 23, along with a seal 26 between each head 24 and the gripper body 121 and a seal 36 around each guide column 34, between the latter and the guide hole 35 in the head, so as to ensure both static and dynamic protection of the gripper against the penetration of dirt or fluids from the outside.

In both cases, moreover, the gripper may be provided with springs 70 (FIG. 5) located between the guide columns 34 and acting to hold the jaws in the closed position even if there is no driving fluid, and the guide columns associated with each piston may be enclosed within a bellows-shaped protective member 60 (FIG. 2).

The invention claimed is:

1. A pneumatic gripper comprising:
 a gripper body with integrated end heads;
 at least two pneumatic control pistons operating within at least one chamber defined by the gripper body and movable in opposite directions with respect to each other along an axis by means of a driving fluid supplied to said chamber;
 at least four guide columns associated with each piston and emerging from the ends of the at least one chamber; and
 at least two jaws or fingers movable with said pistons between an active position for gripping a work-piece and an inactive position for releasing the work-piece, wherein the at least four guide columns are uniformly spaced on a respective control piston about said axis, said guide columns being attached directly in front of the respective control piston and are passed through respective holes formed in a respective end head, and each gripping jaw can be attached directly to the ends of the columns of a relevant control piston, at least one peripheral seal being mounted between each control piston and an internal surface of the chamber in which said control piston is accommodated, at least one seal being mounted between the gripper body and each head thereof, at least one seal being mounted between each guide column and the respective guide hole in the respective head, so as to form a pressurized-air cavity around each guide column in order to prevent dirt or fluids to penetrate into the gripper from the outside.

2. A pneumatic gripper according to claim 1, wherein said gripper body defines a single chamber along with the respective end heads, wherein two control pistons are arranged in line within said chamber and movable simultaneously in opposite directions, wherein said at least four guide columns are attached in front of and inside the profile of each of said pistons and provided with ends protruding from said heads, and one of said gripping jaws is attached to the ends of the guide columns of each control piston for moving said gripping jaws between said active position and said inactive position.

3. A pneumatic gripper according to claim 1, wherein said gripper body defines at least three communicating chambers which are angularly spaced about a central axis of said gripper body and each closed by one of said end heads, said control pistons being accommodated individually within said chambers and movable simultaneously between a position where said control pistons are close to the central axis and a position where said control pistons are far from the central axis, wherein said at least four guide columns are attached in front of and inside the profile of each of said control pistons and provided with ends protruding from said heads, and one of said gripper jaws is attached to the ends of the guide columns of each control piston for moving said gripper jaws between said active position and said inactive position.

4. A pneumatic gripper according to claim 1, further comprising a connector located between and connecting the control pistons in order to synchronize the movements of the gripping jaws between said active position and said inactive position.

5. A pneumatic gripper according to claim 4, wherein the connector comprises a member rotatable about a central pivot pin and said connector has peripheral slots interacting with connecting pins attached to said control pistons.

6. A pneumatic gripper according to claim 1, further comprising springs associated with the control pistons and acting to hold the jaws in the active position in the absence of said driving fluid.

7. A pneumatic gripper according to claim 1, further comprising a flexible guard associated with each head of the gripper body to surround the guide columns connected to each piston at their part emerging from said head.

8. A pneumatic gripper according to claim 1, wherein each of said control pistons comprises an end portion, said end portion having an oblique end surface, said end portion of one of said control pistons facing said end portion of another one of said control pistons, wherein said end portion of said one of said control pistons overlaps said end portion of said another one of said control pistons in said active position.

9. A pneumatic gripper comprising:
 a gripper body comprising at least one chamber, a first integrated end head and a second integrated end head, said first integrated end head comprising four first holes, said second integrated end head comprising four second holes;
 a first pneumatic control piston comprising four first control piston recesses and a longitudinal first control piston axis, each of said four first control piston recesses being located at an equal distance from said longitudinal first control piston axis;
 a second pneumatic control piston comprising four second control piston recesses and a longitudinal second control piston axis, said longitudinal second control piston axis being aligned with said longitudinal first control piston axis, each of said four second control piston recesses being located at an equal distance from said longitudinal second control piston axis, said first pneumatic control piston and said second pneumatic control piston being arranged in said at least one chamber, wherein said first pneumatic control piston is movable in a direction opposite said second pneumatic control piston;

four first guide columns, each of said four first guide columns extending from one end of said at least one chamber, wherein a portion of each of said four first guide columns extends through one of said four first holes, each of said four first guide columns engaging said first pneumatic control piston, each of said four first control piston recesses receiving at least a portion of one of said four first guide columns, wherein each of said four first guide columns is located at an equal distance from said longitudinal first control piston axis;

four second guide columns, wherein a portion of each of said four second guide columns extends through one of said four second holes, each of said four second guide columns extending from another end of said at least one chamber, each of said second guide columns engaging said second pneumatic control piston, each of said four second control piston recesses receiving at least a portion of one of said four second guide columns, wherein each of said four second guide columns is located at an equal distance from said longitudinal second control piston axis;

a first gripper connected to said first pneumatic control piston via said four first guide columns, said first gripper being movable via said first pneumatic control piston between an active first gripper position for gripping a workpiece and an inactive first gripper position for releasing the workpiece;

a second gripper connected to said second pneumatic control piston via said four second guide columns, said second gripper being movable via said second pneumatic control piston between an active second gripper position for gripping the workpiece and an inactive second gripper position for releasing the workpiece;

a first seal mounted between said first pneumatic control piston and a portion of an internal surface defining said at least one chamber;

a second seal mounted between said second pneumatic control piston and another portion of the internal surface defining said at least one chamber;

a third seal provided between said gripper body and said first integrated end head;

a fourth seal located between said gripper body and said second integrated end head;

a plurality of fifth seals, each of said fifth seals being mounted between one of said four first guide columns and one of said four first holes, wherein said plurality of fifth seals form at least a portion of a pressurized air cavity about each of said four first guide columns;

a plurality of sixth seals, each of said sixth seals being mounted between one of said four guide columns and one of said four second holes, wherein said plurality of six seals form at least a portion of another pressurized air cavity about each of said four second guide columns.

10. A pneumatic gripper in accordance with claim 9, wherein each of said four first holes is aligned with one of said four first control piston recesses, said first integrated end head comprising a first integrated end head longitudinal axis, said first integrated end head longitudinal axis being aligned with said longitudinal first control piston axis, wherein each of said four first holes is located at an equal distance from said first integrated end head longitudinal axis, each of said four second holes being aligned with one of said four second control piston recesses, said second integrated end head comprising a second integrated end head longitudinal axis, said second integrated end head longitudinal axis being aligned with said longitudinal second control piston axis, wherein each of said four second holes is located at an equal distance from said second integrated end head longitudinal axis.

11. A pneumatic gripper according to claim 10, wherein each of said first pneumatic control piston and said second pneumatic control piston comprises an end portion, said end portion having an oblique end surface, said end portion of said first pneumatic control piston facing said end portion of said second control piston, wherein said end portion of said first pneumatic control piston overlaps said end portion of said second pneumatic control piston in said active first gripper position and said active second gripper position.

12. A pneumatic gripper comprising:

a gripper body comprising at least one chamber, a first integrated end head and a second integrated end head, said first integrated end head comprising four first holes, said second integrated end head comprising four second holes;

a first pneumatic control piston comprising a longitudinal first control piston axis;

a second pneumatic control piston comprising a longitudinal second control piston axis, said longitudinal second control piston axis being aligned with said longitudinal first control piston axis, said first pneumatic control piston and said second pneumatic control piston being arranged in said at least one chamber, wherein said first pneumatic control piston is movable in a direction opposite said second pneumatic control piston;

four first guide columns, each of said four first guide columns extending from one end of said at least one chamber, wherein a portion of each of said four first guide columns extends through one of said four first holes, each of said four first guide columns engaging said first pneumatic control piston, wherein said four first guide columns are symmetrically arranged about said longitudinal first control piston axis;

four second guide columns, wherein a portion of each of said four second guide columns extends through one of said four second holes, each of said four second guide columns extending from another end of said at least one chamber, each of said second guide columns engaging said second pneumatic control piston, wherein said four second guide columns are symmetrically arranged about said longitudinal second control piston axis;

a first gripper connected to said first pneumatic control piston via said four first guide columns, said first gripper being movable via said first pneumatic control piston between an active first gripper position for gripping a workpiece and an inactive first gripper position for releasing the workpiece; and a second gripper connected to said second pneumatic control piston via said four second guide columns, said second gripper being movable via said second pneumatic control piston between an active second gripper position for gripping the workpiece and an inactive second gripper position for releasing the workpiece.

13. A pneumatic gripper in accordance with claim 12, wherein said first pneumatic control piston comprises four first control piston recesses, said four first control piston recesses being symmetrically arranged about said longitudinal first control piston axis, said second pneumatic control piston comprising four second control piston recesses, said longitudinal second control piston axis being aligned with said longitudinal first control piston axis, said four second control piston recesses being symmetrically arranged about said longitudinal second control piston axis.

14. A pneumatic gripper in accordance with claim 13, wherein each of said four first guide columns comprises a first guide column end portion, said first guide column end portion of each of said four first guide columns being arranged in one of said four first control piston recesses, each of said four second guide columns comprising a second guide column end portion, each of said four second guide columns being arranged in one of said four second control piston recesses.

15. A pneumatic gripper in accordance with claim 14, further comprising:
a first seal mounted between said first pneumatic control piston and a portion of an internal surface defining said at least one chamber;
a second seal mounted between said second pneumatic control piston and another portion of the internal surface defining said at least one chamber;
a third seal between said gripper body and said first integrated end head;
a fourth seal located between said gripper body and said second integrated end head;
a plurality of fifth seals, each of said fifth seals being mounted between one of said four first guide columns and one of said four first holes, wherein said plurality of fifth seals form at least a portion of a pressurized air cavity about each of said four first guide columns;
a plurality of sixth seals, each of said sixth seals being mounted between one of said four guide columns and one of said four second holes, wherein said plurality of six seals form at least a portion of another pressurized air cavity about each of said four second guide columns, each of said four first guide columns being located at equally spaced location from said longitudinal first control piston axis, each of said four second guide columns being located at an equally spaced location from said longitudinal second control piston axis.

16. A pneumatic gripper in accordance with claim 15, wherein each of said four first holes is aligned with one of said four first control piston recesses, said first integrated end head comprising a first integrated end head longitudinal axis, said first integrated end head longitudinal axis being aligned with said longitudinal first control piston axis, wherein each of said four first holes is located at an equal distance from said first integrated end head longitudinal axis, each of said four second holes being aligned with one of said four second control piston recesses, said second integrated end head comprising a second integrated end head longitudinal axis, said second integrated end head longitudinal axis being aligned with said longitudinal second control piston axis, wherein each of said four second holes is located at an equal distance from said second integrated end head longitudinal axis.

17. A pneumatic gripper according to claim 16, wherein each of said first pneumatic control piston and said second pneumatic control piston comprises an end portion, said end portion having an oblique end surface, said end portion of said first pneumatic control piston facing said end portion of said second control piston, wherein said end portion of said first pneumatic control piston overlaps said end portion of said second pneumatic control piston in said active first gripper position and said active second gripper position.

* * * * *

UNITED STATES PATENT AND TRADEMARK OFFICE
CERTIFICATE OF CORRECTION

| | | |
|---|---|---|
| PATENT NO. | : 8,585,113 B2 | Page 1 of 1 |
| APPLICATION NO. | : 13/289351 | |
| DATED | : November 19, 2013 | |
| INVENTOR(S) | : Maffeis | |

It is certified that error appears in the above-identified patent and that said Letters Patent is hereby corrected as shown below:

Title Page: Item 30 please correct -

Foreign Application Date to November 5, 2010

(error reads - May 11, 2010)

Signed and Sealed this
Eighteenth Day of February, 2014

Michelle K. Lee
*Deputy Director of the United States Patent and Trademark Office*